United States Patent
Cai et al.

(10) Patent No.: US 10,253,965 B2
(45) Date of Patent: *Apr. 9, 2019

(54) HEATED LENS LIGHTING ARRANGEMENT WITH OPTIC CABLE EXTENDING FROM LIGHT SOURCE TO AN OPENING IN HEAT EXCHANGER

(71) Applicant: University of Kansas, Lawrence, KS (US)

(72) Inventors: Hongyi Cai, Lawrence, KS (US);
Steven D. Schrock, Lenexa, KS (US);
Eric Fitzsimmons, Manhattan, KS (US)

(73) Assignee: UNIVERSITY OF KANSAS, Lawrence, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,996

(22) Filed: Dec. 5, 2017

(65) Prior Publication Data

US 2018/0094802 A1    Apr. 5, 2018

Related U.S. Application Data

(63) Continuation of application No. 14/915,468, filed as application No. PCT/US2014/053503 on Aug. 29, 2014, now Pat. No. 9,851,086.

(Continued)

(51) Int. Cl.
*F21V 29/70* (2015.01)
*F21S 8/08* (2006.01)
(Continued)

(52) U.S. Cl.
CPC .............. *F21V 29/70* (2015.01); *F21S 8/08* (2013.01); *F21V 29/90* (2015.01); *G02B 6/0008* (2013.01);
(Continued)

(58) Field of Classification Search
CPC .......... F21V 22/00; F21V 22/10; F21V 22/13; F21V 22/15; F21V 22/17; F21V 22/20;
(Continued)

(56) References Cited

U.S. PATENT DOCUMENTS

| | | |
|---|---|---|
| 5,373,571 A | 12/1994 | Reid et al. |
| 7,942,563 B2 | 5/2011 | Gingrich, III et al. |

(Continued)

FOREIGN PATENT DOCUMENTS

WO    2012166122 A1    12/2012

OTHER PUBLICATIONS

International Search Report dated Dec. 18, 2014.

*Primary Examiner* — Robert J May
(74) *Attorney, Agent, or Firm* — Thomas | Horstemeyer, LLP; Heather C. Gorman; Jason M. Perilla

(57) ABSTRACT

According to aspects of the embodiments, a lighting fixture is designed to help prevent the accumulation of snow or ice on the light emitting face (e.g., lens) of the lighting fixture. The lighting fixture harvests both the light and heat generated by at least one light source, such as but not limited to at least one LED light source. The lighting fixture adopts a flip-mount light source mounting design in which one side of a passive heat exchanger is mounted or secured closely adjacent or proximate to the lens, and the light source is mounted or secured to another side of the passive heat exchanger. The heat generated by the light source is conducted by the passive heat exchanger to heat the lens. Additionally, the light emitted from the light source is redirected back through the passive heat exchanger and to the lens using a bundle of light fiber cables.

20 Claims, 5 Drawing Sheets

Related U.S. Application Data

(60) Provisional application No. 61/872,562, filed on Aug. 30, 2013.

(51) Int. Cl.
| | | |
|---|---|---|
| *F21V 29/90* | (2015.01) | |
| *G08G 1/095* | (2006.01) | |
| *F21V 8/00* | (2006.01) | |
| *G02B 6/04* | (2006.01) | |
| *F21W 111/02* | (2006.01) | |
| *F21W 131/10* | (2006.01) | |
| *F21Y 115/10* | (2016.01) | |

(52) U.S. Cl.
CPC ............... *G02B 6/04* (2013.01); *G08G 1/095* (2013.01); *F21V 2200/10* (2015.01); *F21V 2200/17* (2015.01); *F21W 2111/02* (2013.01); *F21W 2131/10* (2013.01); *F21Y 2115/10* (2016.08)

(58) Field of Classification Search
CPC .......... F21V 22/30; F21V 22/40; F21V 29/70; F21Y 2115/10; F21Y 2105/10
See application file for complete search history.

(56) References Cited

U.S. PATENT DOCUMENTS

| | | | |
|---|---|---|---|
| 8,297,790 B2 * | 10/2012 | Kong | ........................ F21K 9/00 362/249.02 |
| 8,746,930 B2 | 6/2014 | Catalano | |
| 2010/0219736 A1 | 9/2010 | Dahm | |
| 2016/0070050 A1 | 3/2016 | Lin | |

* cited by examiner

HEATED LENS LIGHTING ARRANGEMENT WITH OPTIC CABLE EXTENDING FROM LIGHT SOURCE TO AN OPENING IN HEAT EXCHANGER

CROSS-REFERENCE TO RELATED APPLICATIONS

This application is a continuation of U.S. Non-Provisional patent application Ser. No. 14/915,468, filed Feb. 29, 2016, which is the 35 U.S.C. § 371 national stage of PCT Application No. PCT/US2014/053503, filed Aug. 29, 2014, which claims priority to and the benefit of U.S. Provisional Application No. 61/872,562, filed Aug. 30, 2013, the entire contents of all of which applications are hereby incorporated herein by reference in their entirety.

BACKGROUND

Incandescent light bulbs generally produce light by passing current through a wire filament. The wire filament is heated by the current to a relatively high temperature and outputs heat and light. It is noted that incandescent light bulbs are relatively less efficient than other types of bulbs. Some incandescent light bulbs convert less than five percent of energy into visible light, with the remaining energy being wasted as heat. In some cases, the heat generated by incandescent light bulbs is used or relied upon for a particular purpose. For example, the heat generated by incandescent light bulbs may be relied upon to melt snow or ice on outdoor lighting fixtures.

Because of the relatively low cost and wide range of incandescent light bulbs available, incandescent light bulbs are widely used for residential, commercial, and municipal lighting, although newer, more cost effective and efficient light sources are being adopted. Due in part to their relative inefficiency, incandescent light bulbs are now being replaced by other light bulbs, lamps, or devices, such as fluorescent lamps (e.g., including but not limited to compact fluorescent lamps, cold cathode fluorescent lamps, etc.), high intensity discharge lamps, and light-emitting diodes.

BRIEF DESCRIPTION OF THE DRAWINGS

For a more complete understanding of the embodiments and the advantages thereof, reference is now made to the following description, in conjunction with the accompanying figures briefly described as follows.

Figure 1:
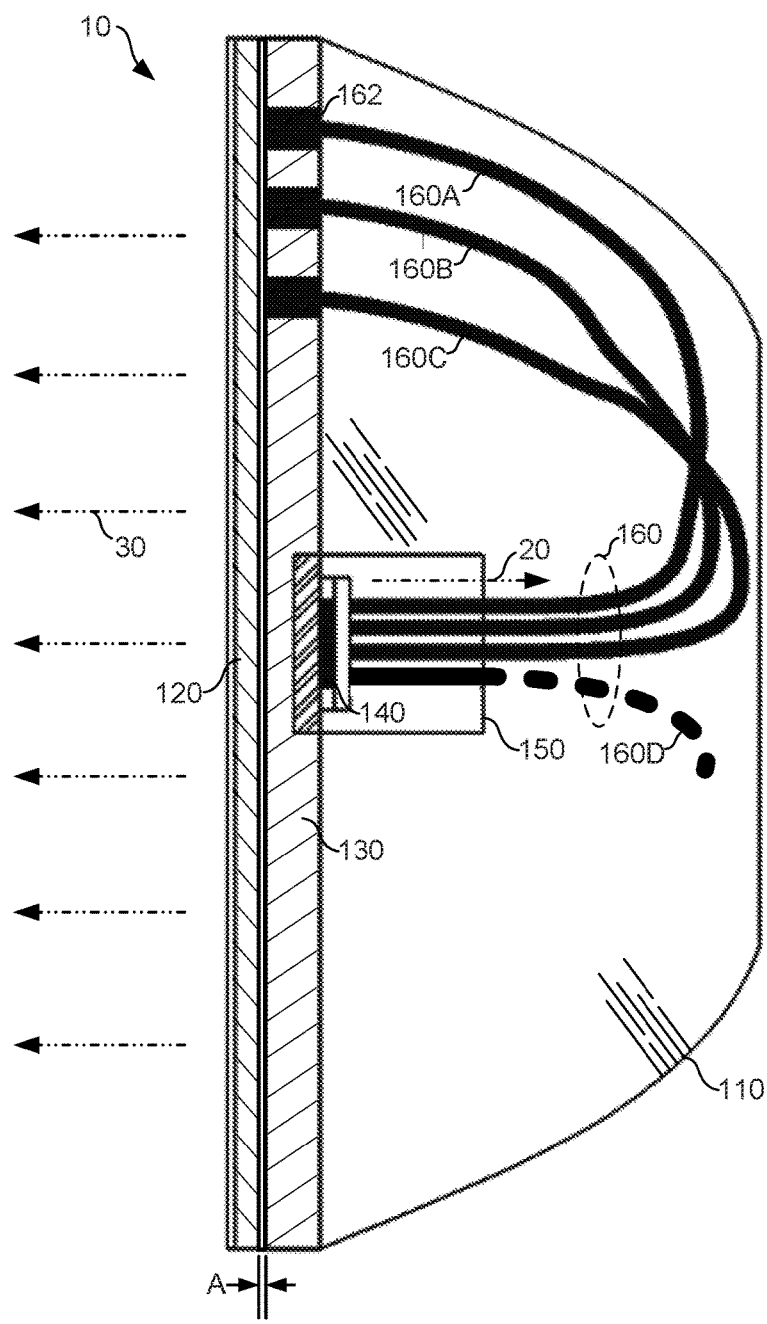
FIG. 1 illustrates a lighting fixture according to an example embodiment described herein.

The drawings illustrate only example embodiments and are therefore not to be considered limiting of the scope of the embodiments described herein, as other embodiments are within the scope of this disclosure. The elements and features shown in the drawings are not necessarily drawn to scale, emphasis instead being placed upon clearly illustrating the principles of the embodiments. Additionally, certain dimensions or positionings may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. The embodiments are not to be considered limited in structure, form, function, or application to the examples set forth herein.

Certain types of lighting fixtures are designed for use outdoors. These lighting fixtures are generally designed to withstand exposure to weather including cycles of heat and cold. It is noted that some outdoor lighting fixtures, such as traffic lights, crosswalk lights, lighted street signs, etc, are used for traffic and/or pedestrian signaling. The buildup of snow or ice on such outdoor lighting fixtures may present or cause a dangerous situation if the light provided by such fixtures is blocked or covered by the buildup of snow or ice.

As noted above, incandescent light bulbs generally produce light by passing current through a wire filament. The wire filament is heated by the current to a relatively high temperature and outputs heat and light. In the case of an outdoor lighting fixture including an incandescent light bulb, the heat generated by the incandescent light bulb can be relied upon, at least in part, to melt any snow or ice that accumulates on the fixture during the winter.

Light emitting diode (LED) light sources have advantages over conventional incandescent, fluorescent, and high intensity discharge (HID) light sources, such as relatively higher energy efficiency, longer life, lower profiles, and environmental benefits. It is expected that LEDs will displace the use of other light sources in many applications. For example, LEDs are being relied upon in outdoor lighting fixtures to a greater extent. In this context, outdoor LED lighting fixtures may include traffic signals, rail signals, post-top luminaires, highway pole and high-mast lights, area lighting fixtures, tunnel lighting luminaires, architectural lighting fixtures, etc.

While LED light sources offer increased lifetimes (e.g., about 50,000-100,000 hours) as compared to other light sources, LEDs produce relatively less waste heat, comparatively. Thus, as incandescent light bulbs are now being replaced in outdoor lighting fixtures by more efficient light sources, such as but not limited to LEDs, generally less heat is available to help with melting snow or ice.

LED light sources also differ from conventional incandescent light bulbs with regard to the manner of light emission and heat generation. Conventional light sources such as incandescent and HID bulbs, for example, radiate light and heat in the same direction. The heat generated by an LED light source, however, is not radiated in the same direction as the light. Instead, relatively more heat is provided at the back of the diode itself. This heat is generally conducted away from the LED light source using a heat exchanger. This may lead to a problem in some lighting fixtures if the heat generated by LEDs is trapped or contained to the back of the fixture. In this case, insufficient heat may be provided or directed toward the lens of the fixture to prevent the accumulation of snow and ice that may cover or block it.

In the context outlined above, according to aspects of the embodiments, a lighting fixture is designed to help prevent the accumulation of snow or ice on the light emitting face (e.g., lens) of the lighting fixture. In one embodiment, the lighting fixture harvests both the light and heat generated by a light source, such as but not limited to an LED light source. The lighting fixture adopts a flip-mount light source mounting design in which one side of a passive heat exchanger is mounted closely adjacent or proximate to the lens, and the light source is mounted or secured to another side of the passive heat exchanger. The heat generated by the light source is conducted away from the light source by the passive heat exchanger to heat the lens. Additionally, the light emitted from the light source is redirected back through the passive heat exchanger and to the lens using a bundle of light fiber cables.

As a result of substantial overlap in the surface area of the passive heat exchanger that is proximate to the lens, the temperature of the lens may be maintained above freezing, resulting in the ability to melt snow and ice in wintery conditions. Based on the principles described herein, outdoor lighting fixtures are able to melt snow and ice to a good extent using the nominal amount of heat produced by a light source, such as but not limited to an LED light source, without the need for additional heat generators or the associated sensors to control them. In this sense, the embodiments, concepts, and principles described herein may be relied upon to help reduce or prevent the accumulation of snow or ice on the light emitting faces of lighting fixtures at a lower overall cost.

Turning to the drawings, various aspects of the embodiments are described in further detail.

FIG. 1 illustrates a lighting fixture 10 according to an example embodiment described herein. The lighting fixture 10 includes a lighting fixture housing 110, a lens 120, a passive heat exchanger 130, a light source 140, a light collector 150, and a light fiber bundle 160. The lighting fixture 10 may be representative of a portion of a traffic signal light, for example, but it should be appreciated that the structures, principles, and concepts described herein are applicable to any type of lighting fixture, whether used indoors or outdoors. The lighting fixture housing 110 provides an overall housing for the lighting fixture 10 and, generally, secures the lens 120 and the passive heat exchanger 130, among other parts of the lighting fixture 10, into place.

According to aspects of the embodiments, the lens 120 of the lighting fixture 10 is heated by way of the passive heat exchanger 130 using heat dissipated from the light source 140. As described in further detail below, this heat energy is conducted away from the light source 140 by the passive heat exchanger 130 and ultimately provided to the lens 120. Because the lens 120 is secured by the lighting fixture housing 110 in a position proximate to the passive heat exchanger 130, as illustrated in FIG. 1, the heat conducted away from the light source 140 by the passive heat exchanger 130 is passed on or provided to the lens 120. To a relatively large extent, this heat is provided to the lens 120 evenly and to its outer edges.

The lens 120 may be formed from any suitable material including glass or plastic, for example. In various embodiments, the lens 120 may take any suitable size and/or shape depending upon the intended use for the lighting fixture 10, among other considerations. The passive heat exchanger 130 may be formed from aluminum, copper, an aluminum-copper alloy, or any other composition suitable for conducting heat away from the light source 140. Depending on the ambient environment, the passive heat exchanger 130 may be formed at least in part using iron or steel, as iron and steel stores heat. Also, the passive heat exchanger 130 may include one or more anodized surfaces to facilitate heat absorption and distribution. The passive heat exchanger 130 may take any suitable size and/or shape, again, depending upon the intended use for the lighting fixture 10, among other considerations. In some embodiments, the passive heat exchanger 130 may include one or more fins on the back for fast heat conduction away from the light source 140, as necessary.

As illustrated in FIG. 1, a space "A" remains between the passive heat exchanger 130 and the lens 120, with the passive heat exchanger 130 and the lens 120 being secured proximately to each other. In various embodiments, this space "A" may be a small as 0 inches (e.g., contact) or larger than about ⅛ inch. In the preferred embodiments, the space "A" is about ⅛ inch. To the extent possible, the lighting fixture 10 may be designed such that the space "A" is substantially uniform across nearly the entire adjacent surface areas of the lens 120 and the passive heat exchanger 130. As further described below, the width of the space "A" may be selected based on a balance between the ability for heat exchange between the lens 120 and the passive heat exchanger 130 and the ability for light carried by the light fiber bundle 160 to disperse or diffuse before crossing the lens 120.

As illustrated in FIG. 1, the light fiber bundle 160 includes a plurality of light fiber cables 160A-160D bundled together by the light collector 150. It should be appreciated that the lighting fixture 10 in FIG. 1 is representative and may include additional or fewer light fiber cables in the light fiber bundle 160. As further discussed below, the lighting fixture 10 may include nineteen light fiber cables, although other numbers of light fiber cables may be relied upon depending upon the total light output and/or size of the lighting fixture 10, for example, among other considerations.

The light collector 150 bundles the light fiber cables 160A-160D together and secures them proximate to or against the light-emitting side of the light source 140. In this context, each of the plurality of light fiber cables 160A-160D extends from the light source 140 at a first distal end to a corresponding aperture in and through the passive heat exchanger 130 at a second distal end, as illustrated in FIG. 1. At the second distal end of each of the plurality of light fiber cables 160A-160C, an end fitting (e.g., see reference 162) is inserted into a corresponding aperture. Each end fitting may be secured within its corresponding aperture using friction, a mechanical connection (e.g., screw, fastening plate, etc.), an adhesive, any other suitable means, or any or combination thereof. Here, it should be appreciated that, although only the light fiber cables 160A-160C are illustrated in FIG. 1 as being inserted into an aperture in the passive heat exchanger 30, each light fiber cable in the lighting fixture 10 would be inserted into a corresponding aperture. The apertures in the passive heat exchanger 130 are further described below with reference to FIG. 2.

Each of the light fiber cables 160A-160D may be embodied as a flexible fiber optic light guide including one or more glass or quartz light guide fibers sheathed in a plastic or PVC-covered monocoil or metal hose, for example. In various embodiments, the light fiber cables 160A-160D may vary in diameter. For example, the light fiber cables 160A-160D may vary in diameter from about ⅛ inch to about ¾ inch or larger, although the use of other diameters of light fiber cables is within the scope of the embodiments. Generally, the light fiber cables 160A-160D are selected to be the shortest practical length based on the size of the lighting fixture 10, although it is noted that the amount of light lost in most suitable light fiber cables is mostly negligible for cables between 1 and 4 feet in length.

The number and diameter of the light fiber cables 160A-160D in the light fiber bundle 160 (and apertures in the passive heat exchanger 130) may depend on various factors, such as the number of light sources 140 used in the lighting fixture 10, the shape and size of the passive heat exchanger 130, the size and optical characteristics of the light sources 140 used in the lighting fixture 10, the uniformity of the luminance from the lens 120 (which may be required or set by codes and/or standards), the transmission and refraction of the lens 120, and any loss of light through the light fiber cables 160A-160D. Thus, the number and diameter of the light fiber cables 160A-160D in the light fiber bundle 160 depends upon various factors. Additionally, the length of the light fiber cables 160A-160D depends on the shape and size of the passive heat exchanger 130 and size of the lighting fixture 10 and the light fixture housing 110, among other factors. Within a relatively small space, the length of the light fiber cables 160A-160D may usually be less than about 1 foot.

The light source 140 may be embodied as an LED light source, although the use of other light sources is within the scope of the embodiments. The light source 140 may be embodied as a high-power (e.g., 25, 50, 100, 200 W, etc.) chip on board LED light source, for example, or another suitable type or structure of high output LED device. In various embodiments, the light source 140 may provide warm or cool white or colored light. For example, the light source 140 may provide a red, yellow, or green light for traffic signaling. The light source 140 may also provide a white light to illuminate a roadway, parking lot, or garage, for example. Additionally or alternatively, the lens 120 may be colored.

As illustrated in FIG. 1, the back or heat-sinking side of the light source 140 is mounted to the passive heat exchanger 130. In this context, the heat-sinking side of the light source 140 may be mounted to the passive heat exchanger 130 at any suitable location and using any suitable means. It is noted that the light source 140 should be mounted to the passive heat exchanger 130 securely, using screws, fasteners, or another suitable attaching means, to ensure good heat transfer from the light source 140 to the passive heat exchanger 130. As necessary, thermal pastes or other heat transfer facilitating compounds may additionally be relied upon.

Typically, the light source 140 should be mounted to the passive heat exchanger 130 at a location for nearly uniform distribution of heat in the passive heat exchanger 130 away from the light source 140. Thus, the light source 140 may, under most circumstances, be mounted proximate to the center of the passive heat exchanger 130. If multiple light sources are relied upon in the lighting fixture 10, it should be appreciated that the light sources should be mounted to the passive heat exchanger 130 at spaced-apart locations to distribute the heat away from each of the light sources relatively evenly throughout the passive heat exchanger 130.

In operation, once powered by a suitable power supply (not shown), the light source 140 emits light 20 in a first direction away from the lens 120. In turn, the light 20 is captured by the light collector 150 and directed into the first distal ends of the light fiber cables 160A-160D of the light fiber bundle 160. This light is then wrapped or directed around and ultimately passed through the passive heat exchanger 130 by the light fiber cables 160A-160D. Particularly, because the second distal ends of the light fiber cables 160A-160D extend through the apertures in the passive heat exchanger 130, the light 20 from the light source 140 is ultimately directed through the lens 120 as light 30.

Meanwhile, heat from the light source 140 conducts through the passive heat exchanger 130. This heat, in turn, is passed on to the lens 120 due to the proximity between the passive heat exchanger 130 and the lens 120. Further, it is noted that, because the major surfaces of the lens 120 and the passive heat exchanger 130 correspond in size, the greater extent of the lens 120 is exposed to heat from the light source 140 by way of the passive heat exchanger 130. Once heated, the lens 120 may melt any accumulation of snow or ice that may form on the outside of the lens 120 in cold conditions.

It should be appreciated that the lighting fixture 10 may be contrasted with lighting fixtures that use heat generators (e.g., thermal wires attached to the lens, infrared LEDs, etc.) and sensors to control them for the purpose of melting snow or ice. Not only do thermal wires consume additional energy, but they also reduce the light transmittance of the lenses. Integrated infrared LEDs also increase energy consumption. In addition, these technologies impart additional costs and points of failure by using sensors and control systems to control the additional generation of heat.

The embodiments described herein rely upon light sources, such as one or more LED light sources, that generate both light and heat throughout a reliable life of about 50,000-100,000 hours. One or more LED light sources may be selected to provide the minimum amount of heat and light for suitable year round operations. For example, the LED light sources may be selected to ensure that the surface temperature of the light emitting face or lens of the lighting fixture is above the freezing temperature of about 32° F. even in the winter, to avoid the accumulation of ice, frost, and/or snow on or over the light emitting face. Further, the LED light sources may be selected to ensure that the brightness and intensity of light output is higher than the threshold values for roadway safety, such as AASHTO (American Association of State Highway and Transportation Officials), IES (Illuminating Engineering Society), CIE (International Commission On Illumination), ANSI (American National Standards Institute), and state and local specifications.

Figure 2:
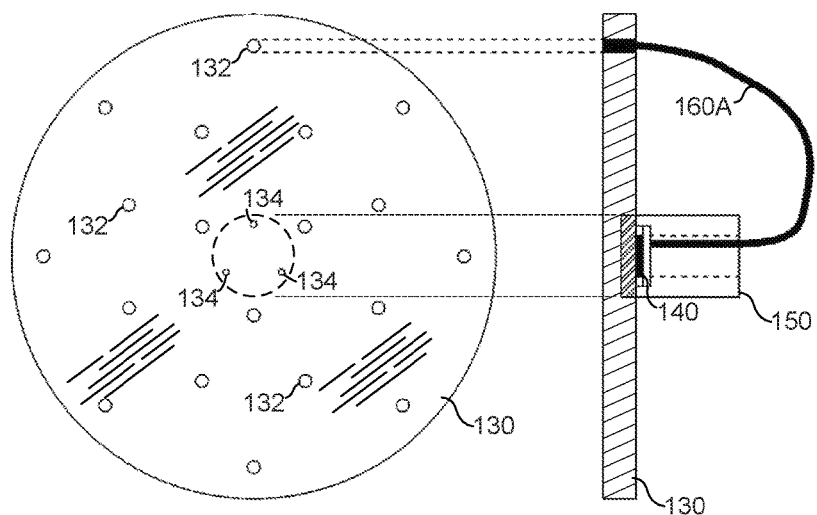
FIG. 2 illustrates a passive heat exchanger and light source of the lighting fixture in FIG. 1 according to an example embodiment described herein.

Turning to the remaining figures, other aspects of the embodiments are described in greater detail. FIG. 2 illustrates the passive heat exchanger 130 and light source 140 of the lighting fixture 10 in FIG. 1 according to an example embodiment described herein. In FIG. 2, a front or plan view of the passive heat exchanger 130 is shown on the left, and a side view of the passive heat exchanger 130 is shown on the right along with the light source 140, the light collector 150, and the light fiber cable 160A. In connection with the front view of the passive heat exchanger 130, the apertures 132 of the passive heat exchanger 130 may be more clearly seen. Generally, the diameter of each of the apertures 132 is selected based on the diameter of the light fiber cables 160A-160D in the light fiber bundle 160. Although not individually identified, a total of nineteen apertures 132 may be identified in FIG. 2. It should be appreciated, however, that the number of apertures through the passive heat exchanger 130 may vary among embodiments. Typically, the number of apertures may depend upon the number of light fiber cables in the light fiber bundle 160, which may depend upon various factors as described above. Additionally, mounting holes 134 for mounting the light source 140 to the passive heat exchanger 130 are illustrated near the center of the passive heat exchanger 130.

Figure 3:
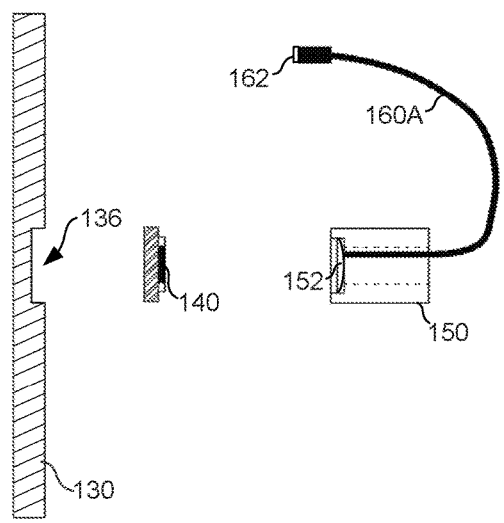
FIG. 3 individually illustrates the passive heat exchanger, the light source, and the light collector of the lighting fixture in FIG. 1 according to an example embodiment described herein.

FIG. 3 individually illustrates the passive heat exchanger 130, the light source 140, and the light collector 150 of the lighting fixture 10 in FIG. 1. In one embodiment, as illustrated in FIG. 3, the passive heat exchanger 130 includes a niche 136. The light source 140 may be mounted within the niche 136 so the heat accumulated on various surfaces (e.g., both the back and side surfaces) of the light source 140 can be conducted away quickly. It should be appreciated, however, that the niche 136 may be omitted from the passive heat exchanger 130, and the light source 140 may be flush mounted upon the passive heat exchanger 130 and secured thereto using screws, bolts, nuts, or any other suitable types of fasteners has discussed above.

As illustrated in FIG. 3, the light collector 150 may include a lens 152 to help focus and direct substantially all light from the light source 140 to the first distal ends of the light fiber cables 160A-160D in the light fiber bundle 160 (FIG. 1). The lens 152 may be embodied as a convex lens formed from any suitable composition of optical glass, for example.

In some embodiments, one or more of the light fiber cables in the light fiber bundle 160 may include a light diffuser 162 fitted at its second distal end. The light diffuser 162 may be either secured to the second distal end of the light fiber cable, as the light diffuser 162 is illustrated as being attached to the second distal end of the light fiber cable 160A in FIG. 3, or mounted or secured into one of the apertures in the passive heat exchanger 130. Each light diffuser 162 may be embodied as a mini lens to adjust the distribution of light from a light fiber cable. For example, each light diffuser 162 may direct, diffuse, or disperse light from an end of a light fiber cable. In this context, the use of light diffusers such as the light diffuser 162 may help to spread or disperse the light 20 from the light source 142 over a greater area of the light emitting face (e.g., the lens 120) of the lighting fixture 10 (FIG. 1).

Figure 4:
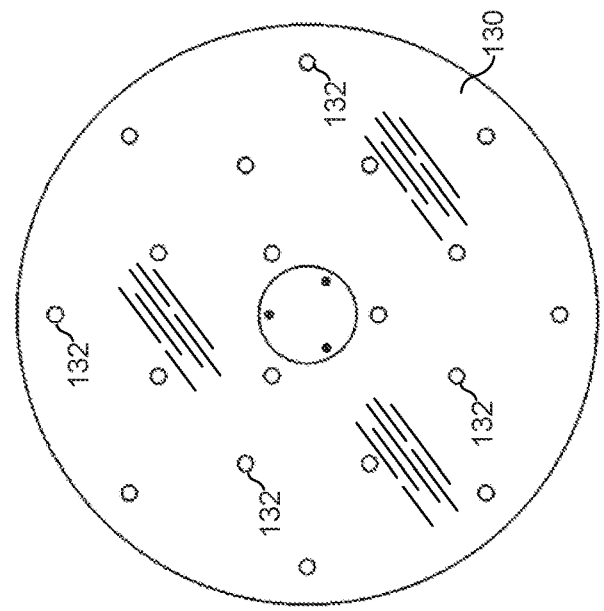
FIG. 4 illustrates the passive heat exchanger of the lighting fixture in FIG. 1 according to an example embodiment described herein.
Figure 4:
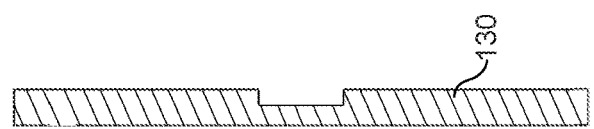
Figure 4:
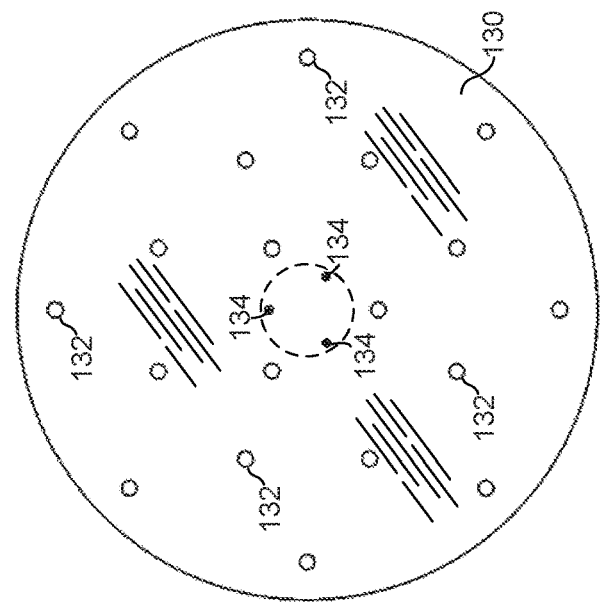

FIG. 4 illustrates the major (e.g., front and back) surfaces of the passive heat exchanger 130 of the lighting fixture 10 in FIG. 1 according to an example embodiment described herein. In FIG. 4, the front of the passive heat exchanger 130 is shown on the right, a cross-sectional side view of the passive heat exchanger 130 is shown in the center, and the back of the passive heat exchanger 130 is shown on the left. In connection with the front and back views of the passive heat exchanger 130, the apertures 132 of the passive heat exchanger 130 may be more clearly seen. Additionally, mounting holes 134 for mounting the light source 140 to the passive heat exchanger 130 are illustrated near the center of the passive heat exchanger 130.

With reference to FIG. 4, it should be appreciated that, although the passive heat exchanger 130 is shown as being circular in FIG. 4, the passive heat exchanger 130 may take other regular or irregular shapes, including multi-sided polygon, oval, etc. Generally, based on the concepts of the embodiments described herein, at least one major surface of the passive heat exchanger 130 should be formed to correspond in shape and size with the light emitting surface (e.g., lens) of the lighting fixture. Additionally, as described in further detail below with reference to FIG. 6, the embodiments described herein encompass passive heat exchangers having major surfaces that are curved as opposed to being generally flat as illustrated in FIG. 3. Further, the embodiments described herein encompass passive heat exchangers having both uniform and non-uniform (e.g., sloped) thicknesses.

Figure 5:
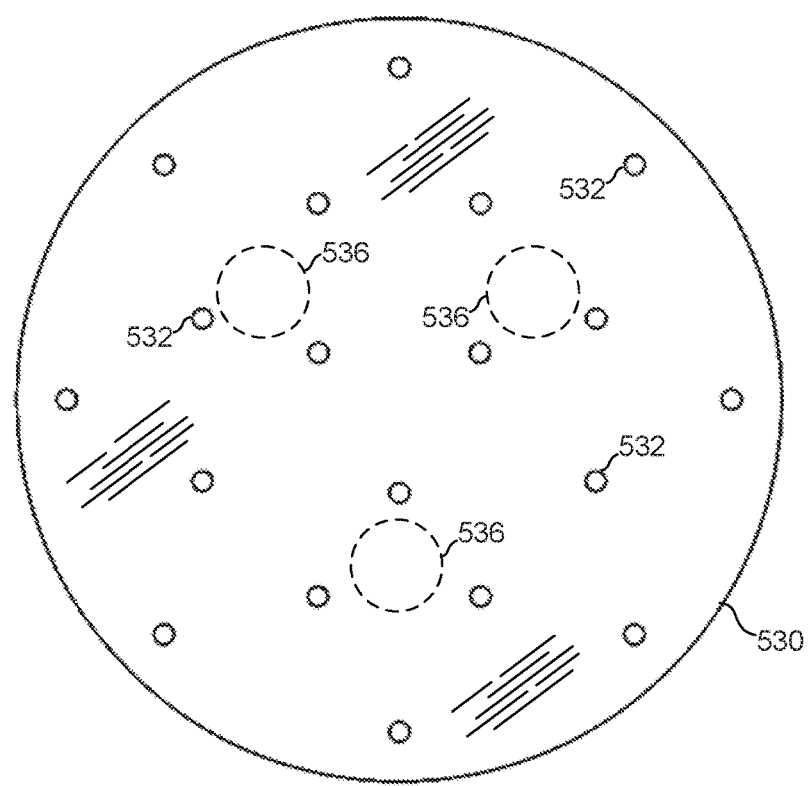
FIG. 5 illustrates another passive heat exchanger according to the embodiments described herein.

Turning to FIG. 5, another passive heat exchanger 530 is illustrated according to the embodiments described herein. In FIG. 5, the front of a passive heat exchanger 530 is illustrated. The passive heat exchanger 530 includes three mounting locations 536. The mounting locations 536 are representative of locations that may be used for mounting multiple light sources similar to the light source 120 described above with reference to FIGS. 1-3. In this context, it is noted that, if multiple light sources are mounted to a passive heat exchanger, the light sources may be mounted at spaced-apart locations on the passive heat exchanger to help evenly disperse heat from the light sources. It is additionally noted that the passive heat exchanger 530 includes a plurality of apertures 532. The positions of the apertures 532 in FIG. 5 are representative only. In alternative embodiments, the positions of the apertures 532 may vary from that illustrated in FIG. 5. Similarly, the positions of the apertures 132 may vary from the positions illustrated in FIGS. 2 and 4. In preferred embodiments, it is noted that the apertures may be evenly spaced to distribute light evenly.

Figure 6:
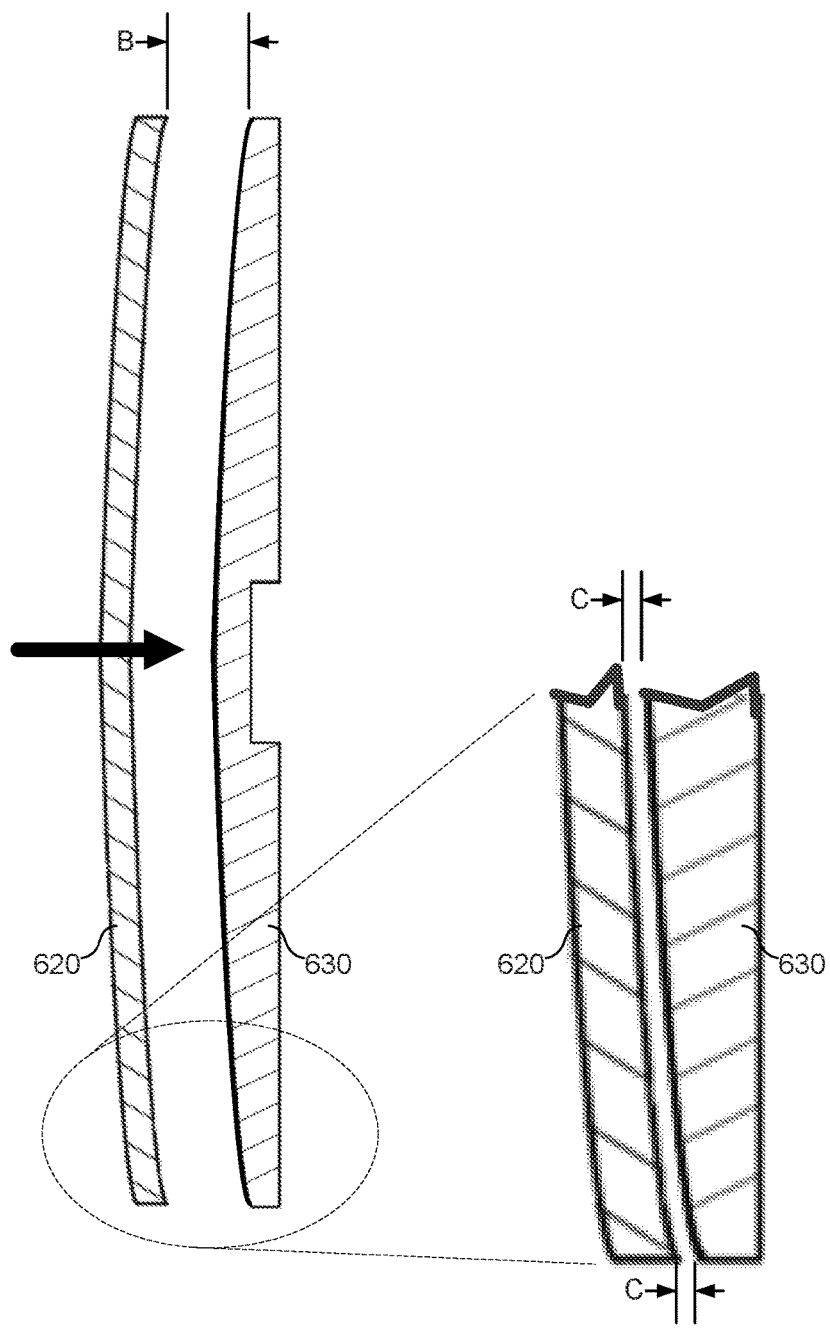
FIG. 6 illustrates an example embodiment of a lens and a passive heat exchanger including semispherical surfaces according to one embodiment described herein.

FIG. 6 illustrates an example embodiment of a lens 620 and a passive heat exchanger 630 including semispherical surfaces according to one embodiment described herein. The side profile of the passive heat exchanger 630 is sloped with a gradually reduced thickness from the center to the edge.

In FIG. 6, it is noted that both the lens 620 and the passive heat exchanger 630 include a major semispherical surface. In this view, it can be appreciated that the space "B" is substantially uniform over the facing concave and convex semispherical surfaces of the lens 620 and the passive heat exchanger 630, respectively. This uniformity leads to uniform heat transfer from the passive heat exchanger 630 to the lens 620 according to the concepts described herein. Additionally, as the lens 620 and the passive heat exchanger 630 are brought into position closer to each other, as illustrated in the exploded portion of the view in FIG. 6, this uniformity in space (i.e., the space "C") may be maintained. As described above, in various embodiments, this space "C" may be smaller or larger than about ⅛ inch. In some embodiments, the spaces "A" (FIG. 1), "B," or "C" may be filled with a gas for better thermal performance.

Table 1 below includes a summary of laboratory test results using LED light sources of various colors (red, green, yellow) in a lighting fixture according to the embodiments described herein. The results show the energy consumed by each LED in different ambient environments (e.g., ambient temperature, relative humidity, air velocity) and the associated surface temperatures of the lens. The test results show that red LEDs consume only about 16.9 to 20.7 watts to maintain the light emitting surface temperature of the lens above the freezing temperature of about 32° F. at an ambient temperature of 10° F., when connected to a traffic control cabinet having an ON time of 44 seconds or longer. For green LEDs, to maintain the light emitting surface temperature of the lens above the freezing temperature of about 32° F. at an ambient temperature of 10° F., the wattage is in a range of above 18.1 to 22.1 watts when connected to the traffic control cabinet having an ON time of 35 seconds or longer, but the wattage jumps to about 50.7 watts when the ON time is 10 seconds. Similarly, for yellow LEDs, to maintain the light emitting surface temperature of the lens above the freezing temperature of about 32° F. at an ambient temperature of 10° F., the wattages is in a range of about 17.3 to 20.8 watts when the ON time is not limited, but the wattage jumps above 47.8 watts when the ON time is only 3 sec.

TABLE 1

| | | | | | | | Control Cabinet | | |
|---|---|---|---|---|---|---|---|---|---|
| LED | Lens | Lens gap | Ambient Temp.(° F.) | RH | Air velocity | Lens temp.(° F.) | | Time On | Cycle Time | Wattage (W) |
| Color | Material | (inch) | Avg. | % | (m/s) | Avg. | STD | (Sec) | (Sec) | Avg. |
| Red | Plastic | 0.125 | 44.9 | 68.8 | 0.000 | 102.8 | 1.8 | N/A | N/A | 48.0 |
| | Glass | N/A | 84.4 | 38.8 | 0.012 | 122.7 | 6.4 | N/A | N/A | 48.0 |
| | Plastic | 0.125 | 8.9 | 44.8 | 0.012 | 51.2 | 1.7 | N/A | N/A | 42.0 |
| | Plastic | 0.125 | 9.3 | 47.4 | 0.012 | 38.6 | 1.0 | N/A | N/A | 21.0 |
| | Plastic | 0.125 | 9.3 | 49.1 | 0.012 | 30.0 | 0.9 | N/A | N/A | 13.0 |
| | Plastic | 0.125 | 7.3 | 39.8 | N/A | 56.4 | 3.5 | N/A | N/A | 31.6 |
| | Plastic | 0.125 | 4.0 | 40.4 | N/A | 25.5 | 1.7 | N/A | N/A | 12.5 |
| | Plastic | 0.125 | 8.0 | 41.8 | 0.012 | 32.3 | 2.2 | N/A | N/A | 16.9 |
| | Plastic | 0.125 | 8.7 | 54.8 | 0.012 | 34.0 | 2.4 | 44 | 82 | 20.7 |
| Green | Plastic | 0.125 | 24.0 | 47.7 | 0.012 | 75.6 | 5.7 | N/A | N/A | 47.8 |
| | Plastic | 0.125 | 50.3 | 62.8 | 0.012 | 150.6 | 5.2 | N/A | N/A | 87.5 |
| | Glass | N/A | 80.0 | 49.5 | 0.012 | 164.6 | 12.4 | N/A | N/A | 52.5 |
| | Glass | N/A | 78.6 | 58.9 | 0.012 | 142.6 | 7.0 | N/A | N/A | 52.5 |
| | Plastic | 0.125 | 21.6 | 38.9 | 0.012 | 94.5 | 5.3 | N/A | N/A | 71.0 |
| | Plastic | 0.125 | 19.5 | 38.3 | 0.012 | 57.4 | 2.5 | N/A | N/A | 33.0 |
| | Plastic | 0.125 | 19.5 | 40.3 | 0.012 | 45.7 | 1.7 | N/A | N/A | 17.0 |
| | Plastic | 0.125 | 9.9 | 40.0 | N/A | 49.1 | 2.5 | N/A | N/A | 26.6 |
| | Plastic | 0.125 | 4.7 | 35.0 | N/A | 19.4 | 1.4 | N/A | N/A | 11.0 |
| | Plastic | 0.125 | 9.3 | 33.3 | N/A | 39.4 | 1.8 | N/A | N/A | 20.1 |
| | Plastic | 0.125 | 7.7 | 32.0 | N/A | 18.3 | 1.1 | N/A | N/A | 8.9 |
| | Plastic | 0.125 | 9.9 | 39.8 | 0.012 | 31.5 | 1.8 | N/A | N/A | 18.1 |
| | Plastic | 0.125 | 11.5 | 59.2 | 0.012 | 32.5 | 1.5 | 35 | 82 | 22.1 |
| | Plastic | 0.125 | 10.5 | 58.9 | 0.012 | 28.2 | 1.4 | 10 | 82 | 50.7 |
| Yellow | Glass | N/A | 15.3 | 58.1 | 0.012 | 93.9 | 10.9 | N/A | N/A | 60.0 |
| | Plastic | 0.125 | 25.9 | 44.1 | N/A | 103.4 | 6.4 | N/A | N/A | 61.0 |
| | Glass | N/A | 53.0 | 56.5 | 0.012 | 114.5 | 8.3 | N/A | N/A | 57.0 |
| | Glass | N/A | 78.8 | 50.6 | N/A | 159.5 | 7.8 | N/A | N/A | 57.0 |
| | Plastic | 0.125 | 77.8 | 50.6 | N/A | 153.8 | 2.7 | N/A | N/A | 57.0 |
| | Plastic | 0.125 | 5.5 | 55.2 | N/A | 94.4 | 4.5 | N/A | N/A | 62.0 |
| | Plastic | 0.125 | 5.4 | 50.3 | N/A | 53.1 | 2.3 | N/A | N/A | 32.0 |
| | Plastic | 0.125 | 4.5 | 52.2 | N/A | 30.1 | 1.2 | N/A | N/A | 13.0 |
| | Plastic | 0.125 | 9.7 | 41.4 | 0.012 | 39.0 | 3.0 | N/A | N/A | 25.4 |
| | Plastic | 0.125 | 3.6 | 38.8 | 0.012 | 13.8 | 1.9 | N/A | N/A | 11.3 |
| | Plastic | 0.125 | 8.7 | 35.1 | 0.012 | 34.1 | 2.7 | N/A | N/A | 20.8 |
| | Plastic | 0.125 | 6.6 | 35.3 | 0.012 | 13.5 | 1.3 | N/A | N/A | 8.7 |
| | Plastic | 0.125 | 9.9 | 45.8 | 0.012 | 31.8 | 2.3 | N/A | N/A | 17.3 |
| | Plastic | 0.125 | 19.3 | 51.5 | 0.012 | 32.6 | 1.9 | 3 | 82 | 47.8 |

Table 2 below includes a summary of laboratory test results using "cool" red light LED traffic lights and traditional light bulb traffic lights. The results show the energy consumed by each traffic light tested in different ambient environments (e.g., ambient temperature, relative humidity, air velocity) and the associated surface temperatures of the lens. The results show that the existing "cool" red LED traffic lights fail to maintain the surface temperature of the lens above the freezing temperature about 32° F. at an ambient temperature of 10° F., which the traditional light bulb succeeds in doing. However, the traditional light bulb also fails to do so when connected to the traffic control cabinet having an ON time of only 3 sec.

TABLE 2

| | | | | | | | | Control Cabinet | | |
|---|---|---|---|---|---|---|---|---|---|---|
| LED | Lens | Lens gap | Ambient Temp.(° F.) | RH | Air velocity | Lens temp.(° F.) | | Time On | Cycle Time | Wattage (W) |
| Color | Material | (inch) | Avg. | % | (m/s) | Avg. | STD | (Sec) | (Sec) | Avg. |
| Red LED | Plastic | N/A | 2.1 | 72.1 | 0.012 | 9.1 | 3.1 | N/A | N/A | 10.4 |
| | Plastic | N/A | 39.6 | 90.3 | 0.012 | 49.4 | 1.4 | N/A | N/A | 10.4 |
| | Plastic | N/A | 80.6 | 54.3 | 0.012 | 85.8 | 0.8 | N/A | N/A | 10.4 |
| | Plastic | N/A | 77.9 | 57.3 | 0.012 | 87.1 | 1.8 | N/A | N/A | 10.4 |
| Light Bulb | Glass | N/A | 44.0 | 75.4 | 0.012 | 122.5 | 25.1 | N/A | N/A | 60.0 |
| | Glass | N/A | 80.8 | 55.2 | 0.012 | 126.0 | 14.8 | N/A | N/A | 60.0 |
| | Glass | N/A | 80.0 | 53.9 | 0.012 | 163.1 | 23.3 | N/A | N/A | 60.0 |
| | Glass | N/A | 23.5 | 52.3 | 0.012 | 105.7 | 24.6 | N/A | N/A | 60.0 |
| | Glass | N/A | 8.3 | 62.6 | 0.012 | 33.0 | 4.3 | 10 | 82 | 60.0 |
| | Glass | N/A | 9.2 | 54.8 | 0.012 | 25.1 | 1.8 | 3 | 82 | 60.0 |

It should be appreciated that the embodiments described herein may be relied upon for both new and retrofit installations. The embodiments may be used for placement of conventional outdoor lighting fixtures without the need for extra installations other than "re-lamping". By design, the embodiments do not alter the functions and sizes of existing lighting fixtures. In many cases, there is also no need to change the supporting electrical devices due to no increases in power consumption. Further, the use of LED light sources may actually lower maintenance costs given the long life of LEDs.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

At least the following is claimed:

1. A lighting fixture, comprising:
a lens;
a heat exchanger including at least one aperture through the heat exchanger;
a housing that secures the lens and the heat exchanger at respective positions with facing surfaces thereof in proximity to each other;
a light source secured to the heat exchanger; and
at least one light fiber cable that extends from the light source at a first distal end to the at least one aperture at a second distal end.

2. The lighting fixture according to claim 1, wherein:
the light source comprises a plurality of light emitting diode (LED) light sources mounted on the heat exchanger for substantially uniform conduction of heat throughout the heat exchanger.

3. The lighting fixture according to claim 1, wherein:
the heat exchanger comprises a mounting niche formed at a proximate center of the heat exchanger for conduction of heat from the proximate center; and
the light source is mounted in the mounting niche.

4. The lighting fixture according to claim 1, wherein:
the housing secures the lens and the heat exchanger with a space between facing surfaces thereof; and
the space is substantially uniform between the facing surfaces.

5. The lighting fixture according to claim 1, wherein the facing surfaces of the lens and the heat exchanger contact each other.

6. The lighting fixture according to claim 1, further comprising a light diffuser at the second distal end of the at least one light fiber cable.

7. The lighting fixture according to claim 1, wherein:
the at least one aperture through the heat exchanger comprises a plurality of apertures through the heat exchanger;
the plurality of apertures are spaced apart across a major surface of the heat exchanger;
the at least one light fiber cable comprises a light fiber bundle comprising a plurality of light fiber cables; and
each of the light fiber cables extends from the light source at a first distal end to a corresponding one of the plurality of apertures at a second distal end.

8. The lighting fixture according to claim 1, wherein the heat exchanger comprises a passive heat exchanger formed of one of copper, aluminum, an aluminum-copper alloy, iron, or steel.

9. The lighting fixture according to claim 1, wherein the heat exchanger comprises one or more fins for conduction of heat away from the light source.

10. A lighting fixture, comprising:
a lens;
a heat exchanger secured by a housing in proximity to the lens, the heat exchanger including at least one aperture through the heat exchanger;
a light emitting diode (LED) light source secured to the heat exchanger;
a light collector that collects light from the LED light source; and
at least one light fiber cable that extends from the light collector at a first distal end to the at least one aperture at a second distal end.

11. The lighting fixture according to claim 10, wherein:
the LED light source comprises a plurality of LED light sources; and
each of the plurality of LED light sources is mounted at a respective location on the heat exchanger.

12. The lighting fixture according to claim 10, wherein:
the heat exchanger comprises a mounting niche; and
the LED light source is mounted in the mounting niche.

13. The lighting fixture according to claim 10, wherein the housing secures the lens and the heat exchanger at respective positions with a space between facing surfaces thereof.

14. The lighting fixture according to claim 10, wherein the housing secures the lens and the heat exchanger at respective positions with contact between facing surfaces thereof.

15. The lighting fixture according to claim 10, further comprising a light diffuser at the second distal end of the at least one light fiber cable.

16. The lighting fixture according to claim 10, wherein:
the at least one aperture through the heat exchanger comprises a plurality of apertures through the heat exchanger;
the plurality of apertures are spaced apart across a major surface of the heat exchanger;
the at least one light fiber cable comprises a light fiber bundle comprising a plurality of light fiber cables; and
each of the light fiber cables extends from the light source at a first distal end to a corresponding one of the plurality of apertures at a second distal end.

17. A lighting fixture, comprising:
a lighting fixture housing;
a lens secured by the lighting fixture housing;
a heat exchanger secured by the lighting fixture housing in proximity to the lens to conduct heat into the lens, the heat exchanger including a plurality of apertures through the heat exchanger;
a light source secured to the heat exchanger; and
a light fiber bundle including a plurality of light fiber cables, at least one of the plurality of light fiber cables extending from the light source at a first distal end to a corresponding one of the plurality of apertures at a second distal end and including a diffuser at the second distal end.

18. The lighting fixture according to claim 17, wherein:
the light source comprises a plurality of light emitting diode (LED) light sources; and each of the plurality of LED light sources is mounted at a respective location on the heat exchanger for substantially uniform conduction of heat throughout the heat exchanger.

19. The lighting fixture according to claim 17, wherein the lighting fixture housing secures the lens and the heat exchanger at respective positions with a space between facing surfaces thereof.

20. The lighting fixture according to claim 19, wherein the lens includes a semispherical surface area and the space between the facing surfaces of the lens and the heat exchanger is substantially uniform over the facing surfaces.

* * * * *